(12) United States Patent
Rubinstein et al.

(10) Patent No.: US 10,212,103 B2
(45) Date of Patent: *Feb. 19, 2019

(54) SMART AUTOMATIC COMPOSITION OF SHORT MESSAGING RESPONSES

(71) Applicant: Microsoft Technology Licensing, LLC, Redmond, WA (US)

(72) Inventors: Mark Rubinstein, Seattle, WA (US); Jason Nelson, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/607,854

(22) Filed: May 30, 2017

(65) Prior Publication Data
US 2017/0264572 A1 Sep. 14, 2017

Related U.S. Application Data

(63) Continuation of application No. 14/822,506, filed on Aug. 10, 2015, now Pat. No. 9,699,298.

(51) Int. Cl.
*H04W 4/00* (2018.01)
*H04L 12/58* (2006.01)
(Continued)

(52) U.S. Cl.
CPC ............ *H04L 51/02* (2013.01); *G06F 3/0482* (2013.01); *H04M 1/72552* (2013.01); *H04M 1/72583* (2013.01); *H04W 4/14* (2013.01)

(58) Field of Classification Search
CPC ...... H04L 51/02; H04L 12/5895; H04W 4/14; H04W 4/12; H04W 88/184; H04M 1/72552; H04M 1/72583; G06F 3/0482
See application file for complete search history.

(56) References Cited

U.S. PATENT DOCUMENTS 6,718,368 B1    4/2004  Ayyadurai
7,503,007 B2    3/2009  Goodman et al.
(Continued)

OTHER PUBLICATIONS

"Non Final Office Action Issued in U.S. Appl. No. 14/822,506", dated Mar. 24, 2016, 25 Pages.
(Continued)

*Primary Examiner* — Moustapha Diaby
(74) *Attorney, Agent, or Firm* — Mark K. Young; Mayer & Williams PC

(57) ABSTRACT

An electronic communication device and method for communication including automatically selecting, composing, and/or presenting a number of proposed responses to a message is disclosed. The device can present the incoming message content to the user together with an alert to the user that one or more proposed responses are available for review and selection. The device can calculate a confidence metric for each proposed response. The user alert and/or presentation of the messages can be made to vary in intensity in accordance with the confidence metric of the one or more proposed responses. The presentation of the proposed responses can be alternated and/or combined with a method for the device to receive user input to the content of the proposed response. The user can edit a proposed response rather than composing a complete response.

20 Claims, 11 Drawing Sheets

(51) Int. Cl.
  *H04M 1/725* (2006.01)
  *H04W 4/14* (2009.01)
  *G06F 3/0482* (2013.01)

(56) References Cited

U.S. PATENT DOCUMENTS

| | | |
|---|---|---|
| 7,657,600 B2 | 2/2010 | Auhagen |
| 7,751,533 B2 | 7/2010 | Makela |
| 8,082,151 B2 | 12/2011 | Bangalore et al. |
| 8,275,351 B1 | 9/2012 | Cazanas et al. |
| 8,589,407 B2 | 11/2013 | Bhatia |
| 2008/0319750 A1 | 12/2008 | Potter |
| 2009/0077464 A1 | 3/2009 | Goldsmith |
| 2012/0323928 A1* | 12/2012 | Bhatia ............... G06F 17/30528 707/748 |
| 2015/0058720 A1* | 2/2015 | Smadja ............... G06F 3/048 715/271 |
| 2015/0302301 A1* | 10/2015 | Petersen ............... G06N 5/04 706/11 |
| 2016/0330597 A1* | 11/2016 | Kalkounis ............ G06F 17/276 |

OTHER PUBLICATIONS

"Final Office Action Issued in U.S. Appl. No. 14/822,506", dated Aug. 19, 2016, 26 Pages.
"Notice of Allowance Issued in U.S. Appl. No. 14/822,506", dated Mar. 1, 2017, 11 Pages.
Adaptive Messaging—Published Date: Jan. 13, 2013, Available at: http://www.adaptive-samsung.com/e-commerce.php (2 pages total).

* cited by examiner

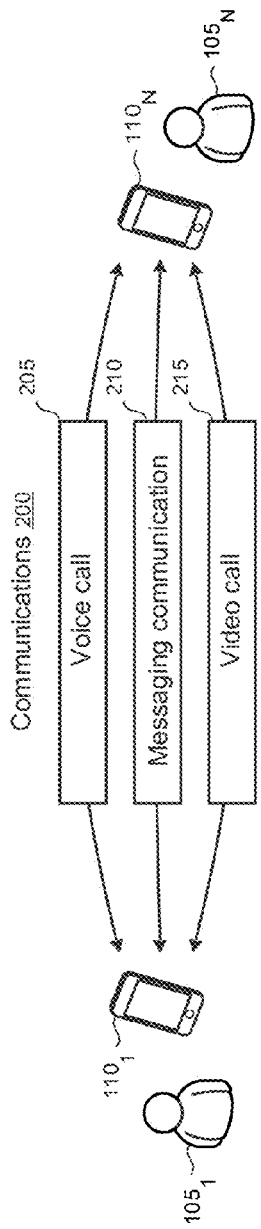
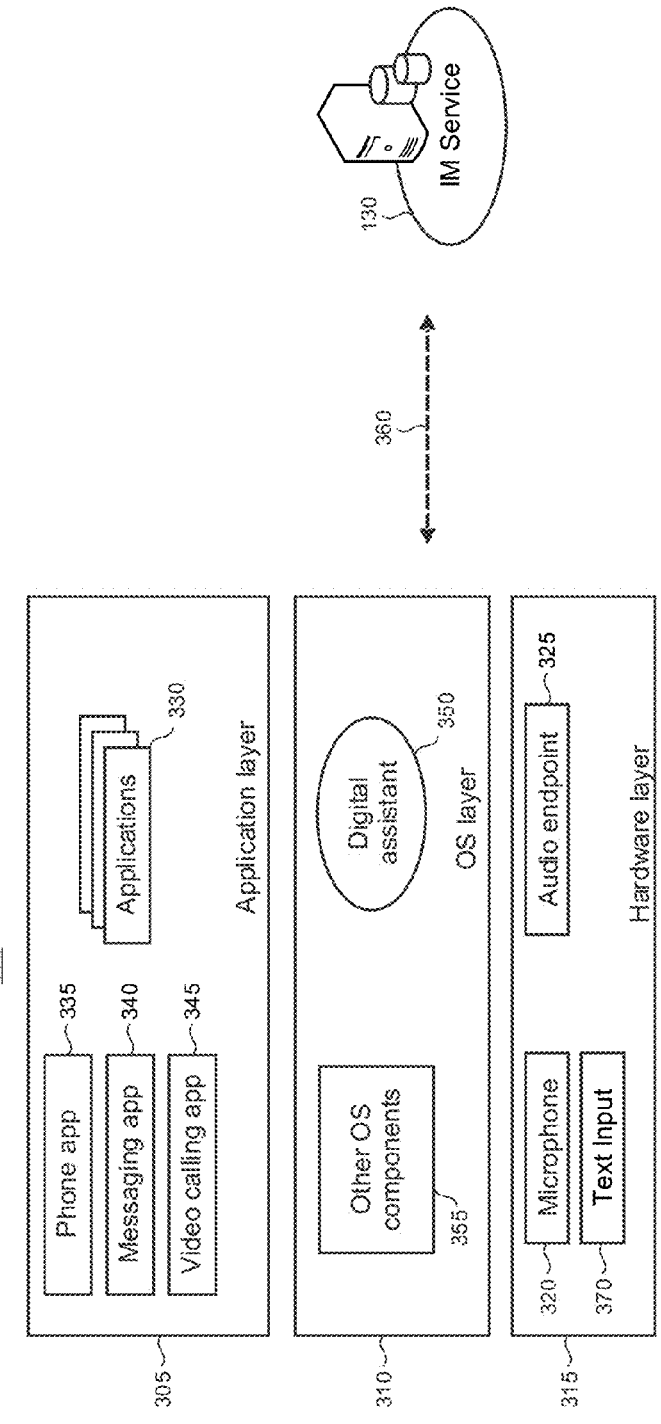

SMART AUTOMATIC COMPOSITION OF SHORT MESSAGING RESPONSES

STATEMENT OF RELATED APPLICATIONS

This application is a continuation of U.S. application Ser. No. 14/822,506, field Aug. 10, 2015, entitled, "SMART AUTOMATIC COMPOSITION OF SHORT MESSAGING RESPONSES" which is incorporated herein by reference in its entirety

BACKGROUND

A user communicating with others using a device such as a smartphone, tablet, wearable device, or personal computer often has access to information via that smartphone, tablet, wearable device, or computer that is relevant to the communication.

SUMMARY

An electronic communication device can facilitate communication by automatically selecting, composing, and/or presenting to the user a number of proposed responses to an incoming message. The proposed responses may be selected from a number of prepared and/or generic responses. The proposed responses may also be composed with reference to the context of the incoming message content. In composing context-aware proposed responses, the device may reference user data available to it, including contact data, calendar data, and/or location data. The device can present the incoming message content to the user together with an alert to the user that one or more proposed responses are available for review and selection. The proposed responses can be invoked by the user through interaction with the device.

Additionally, the device can calculate a confidence measurement or relevance metric with respect to each proposed response. The user alert can be made to vary in intensity in accordance with the confidence metric of the one or more proposed responses. The presentation of the messages themselves can be in order of confidence or relevance. The presentation can vary in intensity corresponding to the confidence or relevance.

The presentation of the proposed responses can be alternated and/or combined with a method for the device to receive user input to the content of the proposed response. In this way, the user can edit a proposed response, rather than composing a complete response. Such smart automated composition may increase user efficiency when interacting with the device by reducing input errors that are associated with conventional manual, non-automated messaging response composition. In addition, devices resources which are typically limited, such as a memory, battery power, network bandwidth, and processor cycles can be more effectively utilized as a result of the increased efficiency of user interaction with the device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It may be appreciated that the above-described subject matter may be implemented as a computer-controlled apparatus, a computer process, a computing system, or as an article of manufacture such as one or more computer-readable storage media. These and various other features may be apparent from a reading of the following Detailed Description and a review of the associated drawings.

DESCRIPTION OF THE DRAWINGS

FIG. 2 illustrates device-to-device communications including, for example, voice calls, instant messaging (IM), and video chats;

FIG. 3 shows an illustrative layered architecture that may be instantiated on a given device that supports various applications, including communication;

Like reference numerals indicate like elements in the drawings. Elements are not drawn to scale unless otherwise indicated.

DETAILED DESCRIPTION

Figure 1:
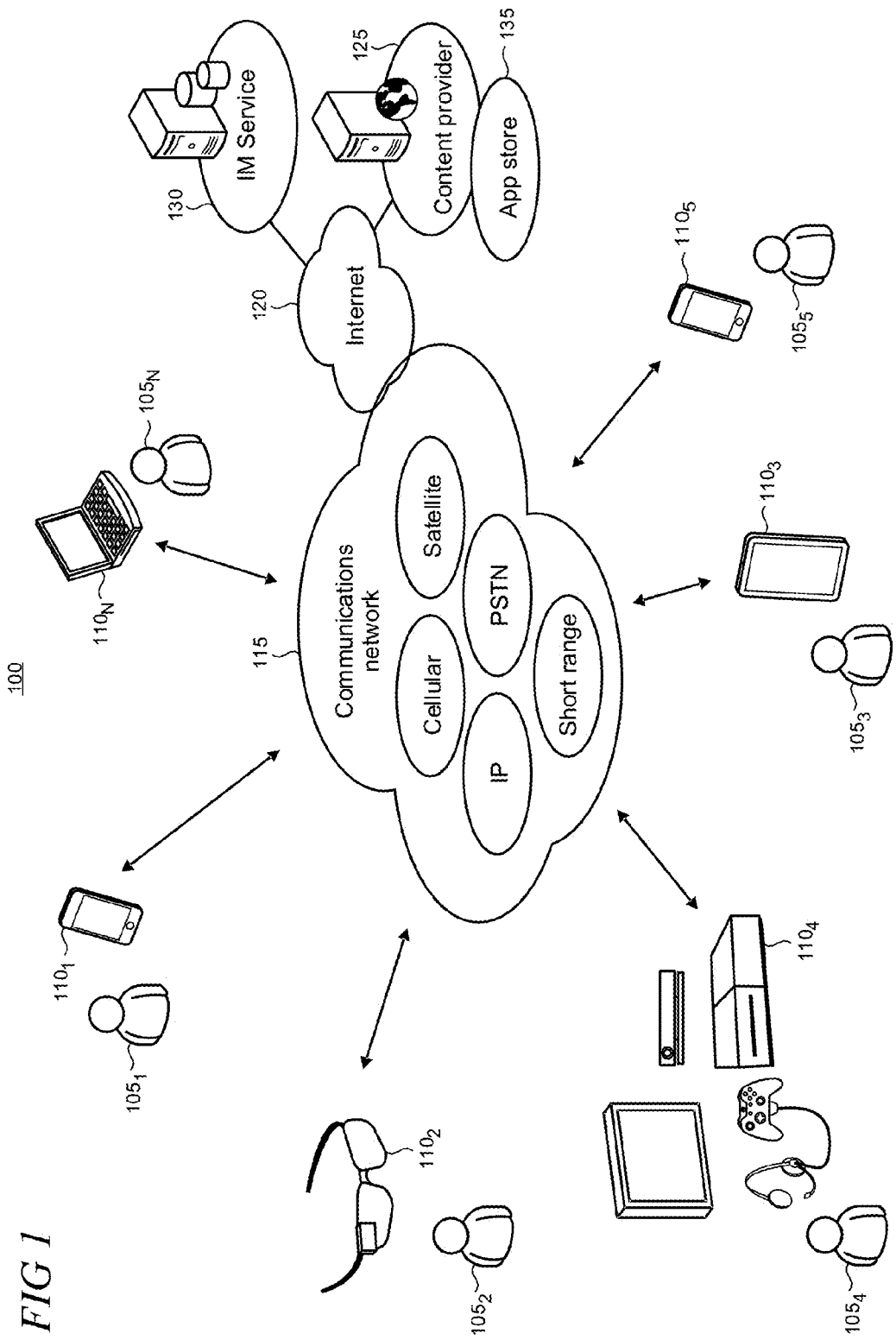
FIG. 1 shows an illustrative communications environment in which various users employ respective devices that communicate over a communications network.

FIG. 1 shows an illustrative communications environment 100 in which various users 105 employ respective devices 110 that communicate over a communications network 115. The devices 110 provide various communication capabilities, such as voice and video calling and messaging, and typically support data-consuming applications such as Internet browsing and multimedia (e.g., music, video, etc.) consumption in addition to various other features. The devices 110 may include, for example, user equipment, mobile phones, cell phones, feature phones, tablet computers, and smartphones. Users often employ such devices to make and receive voice and/or multimedia (i.e., video) calls, or more particularly to engage in messaging (e.g., texting) and email communications, in addition to using applications and accessing services that employ data, browse the World Wide Web, and the like. However, alternative types of electronic devices are also envisioned to be usable within the communications environment 100 so long as they are configured with communication capabilities and can connect to the communications network 115. Such alternative devices variously include handheld computing devices, PDAs (personal digital assistants), portable media players, phablet devices (i.e., combination smartphone/tablet devices), wearable computers, navigation devices such as GPS (Global Positioning System) systems, laptop PCs (personal computers), desktop computers, multimedia consoles, gaming systems, or the like. In the discussion that follows, the use of the term "device" is intended to cover all devices that are configured with communication capabilities and are capable of connectivity to the communications network 115.

The various devices 110 in the environment 100 can support different features, functionalities, and capabilities (here referred to generally as "features"). Some of the features supported on a given device can be similar to those supported on others, while other features may be unique to a given device. The degree of overlap and/or distinctiveness among features supported on the various devices 110 can vary by implementation. For example, some devices 110 can support touch controls, gesture recognition, and voice commands, while others may enable a more limited user interface (UI). Some devices may support video consumption and Internet browsing, while other devices may support more limited media handling and network interface features.

As shown, the devices 110 can access the communications network 115 in order to implement various user experiences. The communications network can include any of a variety of network types and network infrastructure in various combinations or sub-combinations including cellular networks, satellite networks, IP (Internet-Protocol) networks such as Wi-Fi and Ethernet networks, a public switched telephone network (PSTN), and/or short range networks such as Bluetooth or Near Field Communication (NFC) networks. The network infrastructure can be supported, for example, by mobile operators, enterprises, Internet service providers (ISPs), telephone service providers, data service providers, and the like. The communications network 115 typically includes interfaces that support a connection to the Internet 120 so that the mobile devices 110 can access content provided by one or more content providers 125 and access an IM service 130. In this illustrative example, the content provider 125 supports an app store 135.

The devices 110 and communications network 115 may be configured to enable device-to-device communication. As shown in FIG. 2, such device-to-device communications 200 can include, for example, voice calls 205, instant messaging (IM) 210, and video chats 215. While communications 200 are depicted between two devices 110, it is noted that multi-party communications (e.g., teleconferencing and group messaging) may also be implemented. Support for device-to-device communication 200 may be provided using one or more applications that run on a device 110.

For example, FIG. 3 shows an illustrative layered architecture 300 that may be instantiated on a given device 110 that supports various applications. The architecture 300 is typically implemented in software, although combinations of software, firmware, and/or hardware may also be utilized in some cases. The architecture 300 is arranged in layers and includes an application layer 305, an OS (operating system) layer 310, and a hardware layer 315. The hardware layer 315 provides an abstraction of hardware used by the device 110 (e.g., input and output devices, networking and radio hardware, etc.) to the layers above it. In this illustrative example, the hardware layers support a microphone 320 and audio endpoint 325 which may include, for example, the device's internal speaker, a wired or wireless headset/earpiece, external speaker/device, and the like. Hardware layer 315 may also include a text entry device 370. Text entry device 370 can be embodied as a dedicated hardware keyboard, such as a QWERTY type or one of the known variants thereof. In other embodiments, the text entry device 370 may be embodied via a touch-sensitive tactile device, i.e., touch screen or the like, for example as implemented on a smartphone device $110_1$, or tablet device $110_3$, without limitation. Text entry device 370 may also be implemented by some combination of hardware including microphone 320, together with speech recognition software implemented either in the application layer 305 and/or OS layer 310, an example of the latter being part of a digital assistant 350.

Figure 4:
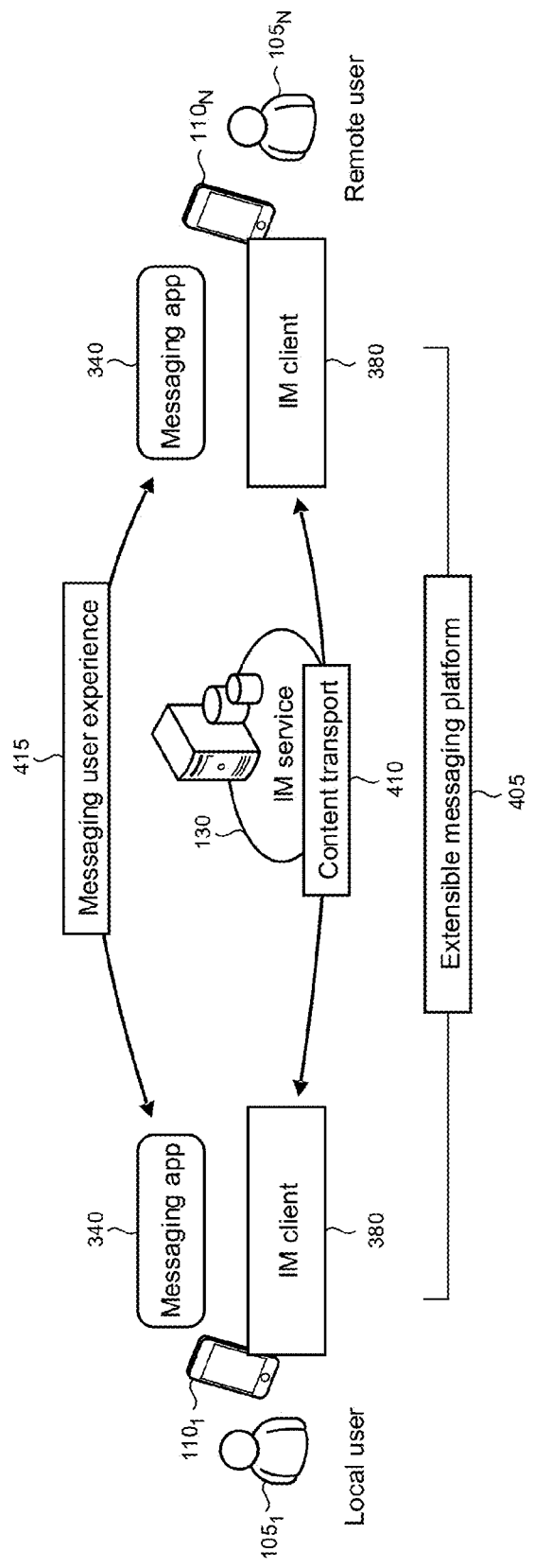
FIG. 4 shows an illustrative extensible messaging platform that supplies the underlying content transport for a messaging user experience that is instantiated on each of local and remote devices.

The application layer 305 in this illustrative example supports various applications (apps) 330 (e.g., web browser, map app, email app, etc.), as well as a phone app 335, messaging app 340, and video calling app 345, such as Skype™ One example of a messaging app 340 can be an IM client 380 (See, FIG. 4). One commercially available example of the IM client is also distributed by Microsoft Corporation under the SKYPE™ brand. However, the IM client 380 is not limited to this one example. The apps 330 are often implemented using locally executing code. However in some cases, these apps may rely on services and/or remote code execution provided by remote servers or other computing platforms such as those supported by the IM service 130 or other cloud-based resources. While the apps 330, 335, 340, and 345 are shown here as components that are instantiated in the application layer 305, it will be appreciated that the functionality provided by a given app may be implemented, in whole or part, using components that are supported in either the OS or hardware layers.

The messaging app 340 is typically configured to interact with the IM service 130, as indicated by line 360 when providing IM and other services such as voice calling and video chat. In addition, the messaging app 340 may utilize and/or interact with other OS components 355 (and/or other components that are instantiated in the other layers of the architecture 300) and/or other remote services as may be needed to implement the various features and functions described herein. While the messaging app 340 is shown in this illustrative example as being instantiated in the application layer 305, it will be appreciated that the functionality provided by the messaging app 340 may be implemented, in whole or part, using components that are supported in either the OS and/or hardware layers.

The OS layer 310 supports the digital assistant 350 and various other OS components 355. In some cases, the digital assistant 350 can interact with the external services as well. In addition, it may utilize and/or interact with the other OS components 355 (and/or other components that are instantiated in the other layers of the architecture 300) as may be needed to implement the various features and functions described herein. While the digital assistant 350 is shown in this illustrative example as being instantiated in the OS layer 310, it will be appreciated that the functionality provided by the digital assistant may be implemented, in whole or part, using components that are supported in either the application or hardware layers. At least one example of a digital assistant functionality is given by the MICROSOFT CORTANA software. In certain implementations of the presently described principles, a digital assistant 350 may have associated therewith a distinctive visual or aural representation, device, or iconography. Use of such a visual or aural representation can instantly communicate to the user the invocation of some function of the digital assistant 350.

Referring now to FIG. 4, the IM service 130 and IM clients 380, the latter as instance of the messaging app 340, function as an extensible messaging platform 405 that supplies the underlying content transport 410 for a messaging user experience 415 that is instantiated on each of the local and remote devices 110.

Figure 5:
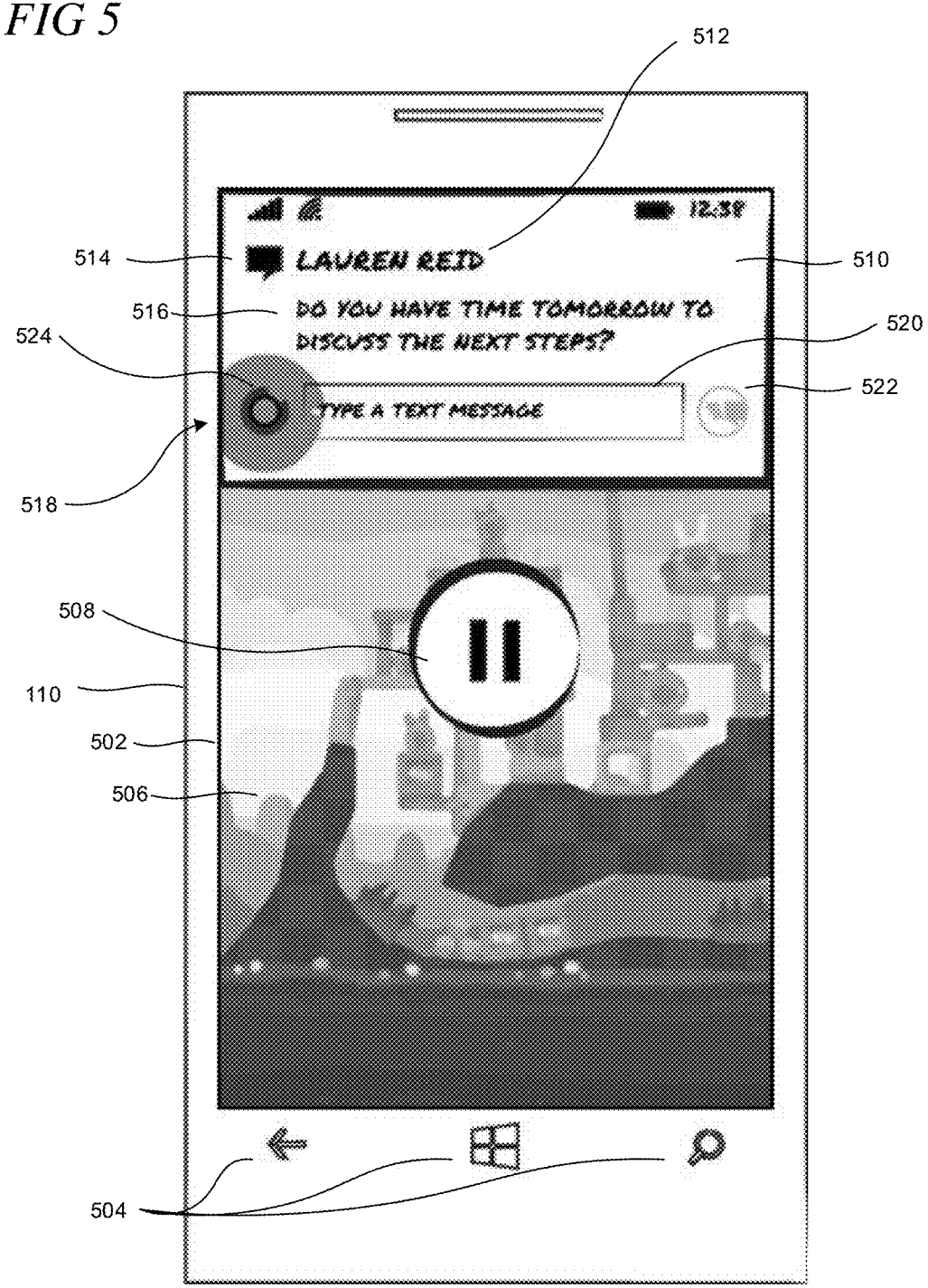
FIG. 5 shows an illustrative user experience in conducting a messaging communication.

FIG. 5 shows an illustrative user experience in conducting a messaging communication according to certain embodiments of the presently described principles. The device 110 in FIG. 5 may be embodied as a smartphone device, including a graphic display 502, which in some implementations may be sensitive to tactile input. The device 110 may include one or more function key areas 504. Function key areas 504 may respond to user tactile input with predetermined functionality, and may be embodied as touch sensitive buttons, hard or soft keys, or as part of the display 502.

In use, a user 105 may be performing some task on the device 110 at the time an incoming message is received. For example, the user 105 may be using a gaming application 506 on the display 502. In response to an incoming message, the messaging app 340 can interrupt the gaming application 506, either independently or through or with the digital assistant 350 or other OS components 355. The gaming application 506 responds to the interrupt by displaying an appropriate visual indicator 508.

The messaging app 340 then displays the incoming message 510. Included in the display may be a sender 512 of the message, indicia 514 of the messaging platform, and some or all of the message contents 516. The messaging app may also display a reply area 518 to facilitate a user 105 in replying to the incoming message 510. Reply area 518 may include a text box 520 for the user 105 to input a reply to the incoming message 510. Optionally, a send button 522 is displayed to send the reply. In FIG. 5, the send button is depicted at a reduced intensity, which in this case indicates that the send button 522 is not active until some reply is ready to be sent, for example by populating the text box 520.

In certain embodiments, tactile input by the user 105 in the text box 520 area may bring up a virtual keyboard 702 (see, FIG. 7) on the display 502. The user 105 could then use the virtual keyboard to enter a reply to the incoming message. It is also the case that the digital assistant 350 may suggest a response to the incoming message 510. The suggested response may be one of a number of predetermined responses. The suggested response may be selected according to a contextual match with the message contents 516. The digital assistant 350 may also have access to user data that informs the response. For example, the message contents 516 in FIG. 5 are an effective meeting request. By access to a calendar app (for example among applications 330), the digital assistant can propose an acceptance or rescheduling, depending upon the user's planned state as indicated in the calendar data. In another embodiment, the message contents 516 may be discernable as a request for information, for example contact information of a particular individual by name. In that case, the digital assistant 350 will have access to contact data stored on or accessible to the device 110. The digital assistant 350 may search the contact data for responsive information, and incorporate that responsive information into a proposed response 602 (see FIG. 6). In still another embodiment, the digital assistant 350 may have access to location information of the device 110, for example by receipt and decoding of GNSS (Global Navigation Satellite System) signals, or geolocation by triangulation with wireless IP and/or cellular communication locations. Location information can be leveraged in response to a discernable inquiry in the message contents 516. In still another implementation of the presently described principles, the digital assistant 350 may have access to prior communications of the user 105, including any prior communication with the particular sender 512. Prior communication data, including without limitation time and subject matter contents, e.g., 516, can be used as a model for composition of a proposed response 602.

In those cases where the digital assistant 350 has a response to propose, this may be indicated to the user 105 via visual indicia 524 in the reply area 518. In other embodiments, an aural alert may signal to the user that the digital assistant has a response to propose. The indicia 524 may be made to flash on the display 502 and/or be animated in some way. Indicia 524 may include a highlighted or attention-capturing color. The indicia 524 and/or aural alert may be chosen specifically to represent the digital assistant 350. For example, indicia 524 includes the concentric circles logo affiliated with MICROSOFT CORTANA. Accordingly, the user knows at first glance that the indicia 524 is related to the digital assistant 350.

The size or intensity of alert, for example the indicia 524, and/or its animation, color saturation, volume etc., may vary in accordance with a confidence measure or relevance metric of the proposed responses. For example, one of a number of generic responses is proposed response 602c (see FIG. 6) stating "I will text you back later." By contrast proposed response 602b, stating "Yes, I am free at LOAM," is suggested by the digital assistant 350 with reference to a user's calendar data, after determining that there is no scheduling conflict for a meeting beginning at LOAM. The proposed response 602c can be considered a lower confidence response than proposed response 602b, in that proposed response 602b is selected according to the context of the message content 516. In still another embodiment, the indicia 524 may not appear unless and until a digital assistant 350 can provide a proposed response 602 that exceeds a predetermined confidence threshold.

Figure 6:
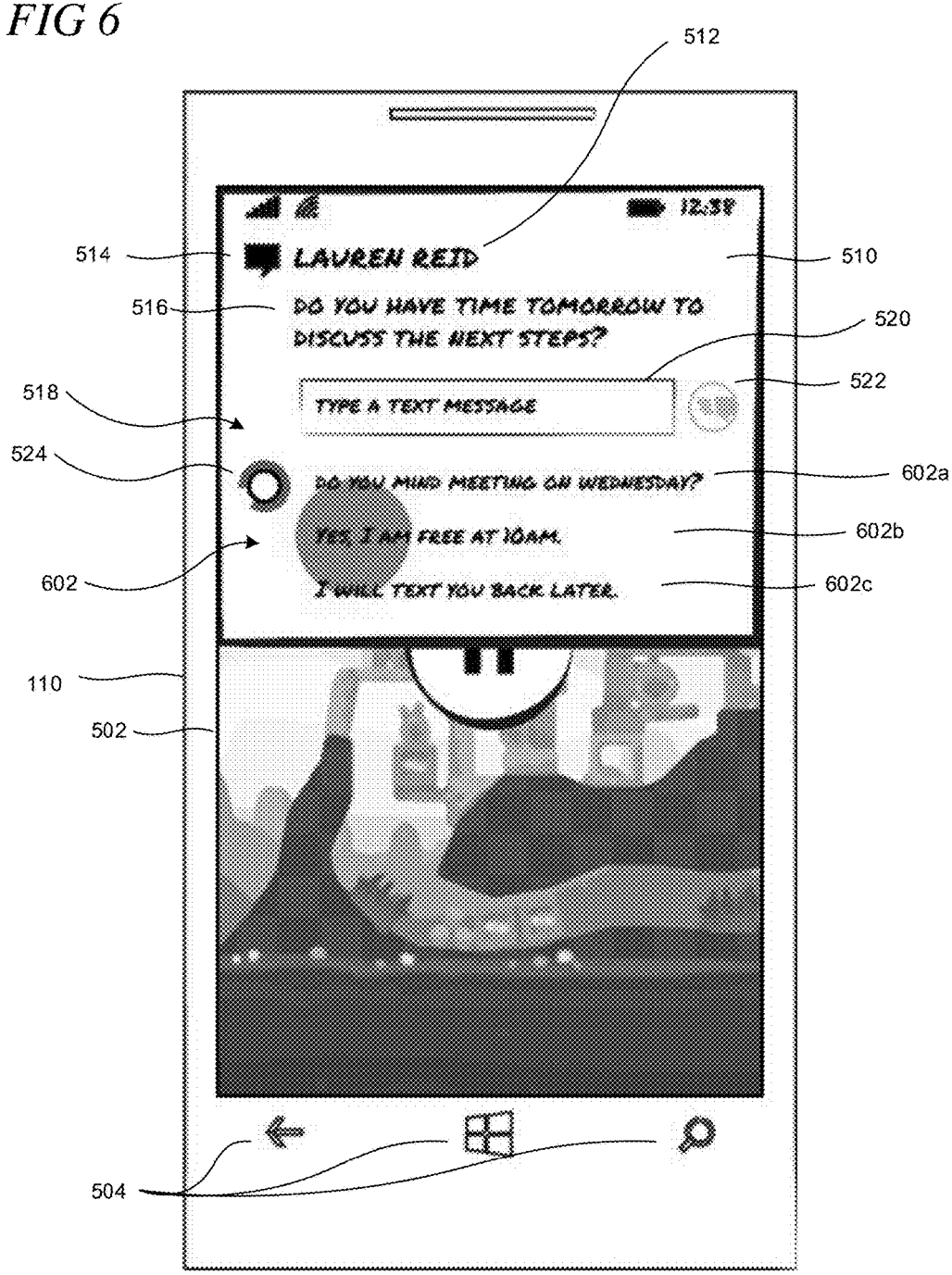
FIG. 6 further shows an illustrative user experience in conducting messaging communication.

The user 105 may elect to review proposed responses from the digital assistant 350 by tactile input in the area of the indicia 524 as depicted in FIG. 5. FIG. 6 shows an illustrative user experience in conducting a messaging communication according to certain embodiments of the presently described principles after a user 105 invokes the digital assistant 350, as in by tactile input in the area of the indicia 524. In a similar way that tactile input by the user 105 in the text box 520 area would bring up a virtual keyboard, tactile input in the area of the indicia 524 expands the reply area 518 to display one or more proposed responses 602a, 602b, 602c, or collectively 602. In certain embodiments that include a measure of confidence in the proposed response, the responses may be listed in rank order of confidence. Furthermore, the responses may be distinguished from one another according to their confidence level. For example and without limitation, confidence level may be expressed via display font size, color intensity (e.g., gray meaning low confidence, to black meaning high confidence), adding a visual highlighting to higher confidence proposed responses 602, flashing certain proposed responses 602 (with the rate or frequency of flash related to a confidence level).

The user 105 may select one of the proposed responses 602 to the incoming message 510. The user selection of a response may be by tactile input in the area of the selected response 602a-602c. The user selection may be visually confirmed on the display, for example by visual indicia 524, and/or confirmed by haptic feedback. Thereafter, the user may send the selected response by use of the send button 522. Alternatively, the selected response may be automatically sent, without further user input.

Figure 7:
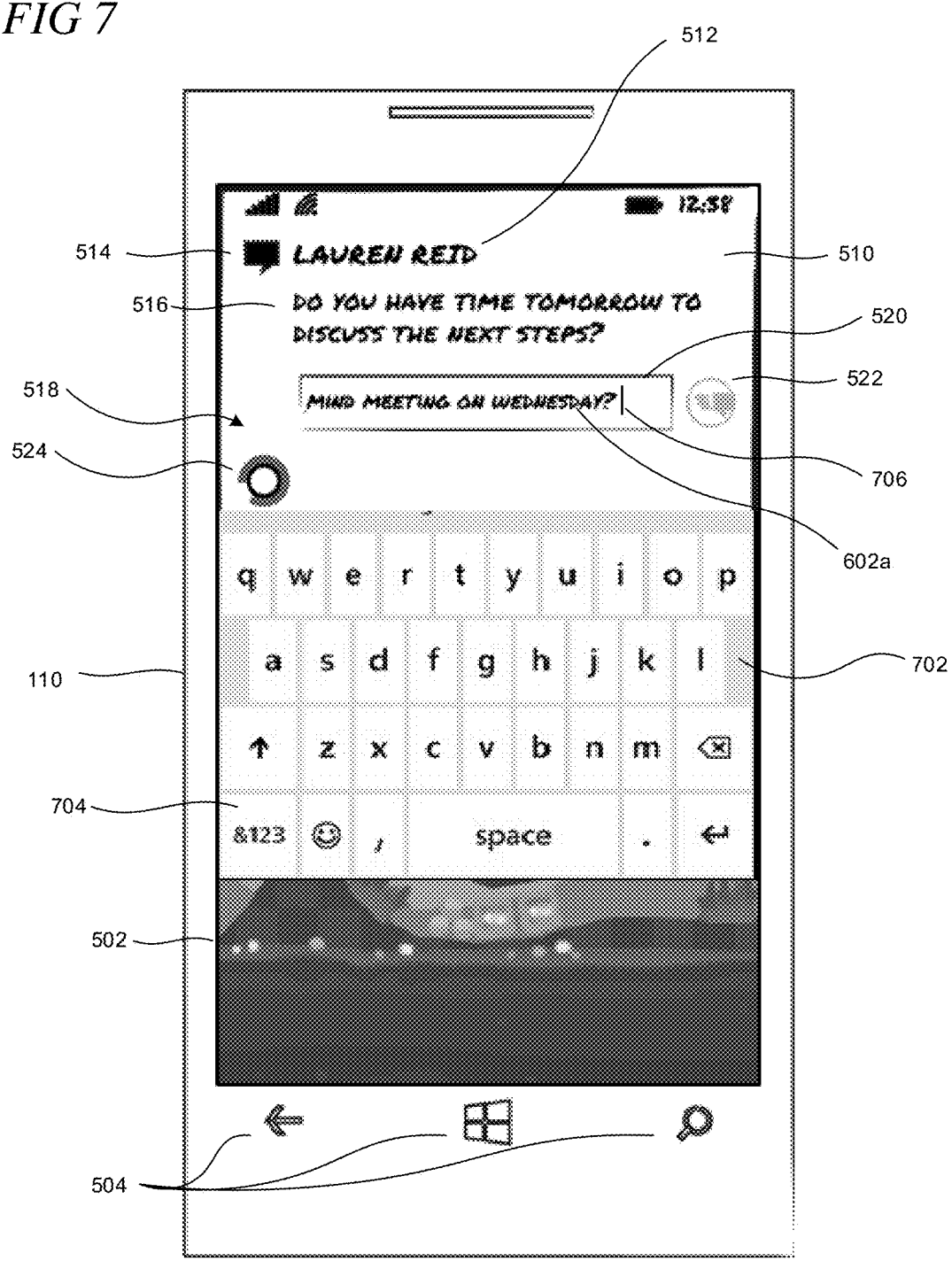
FIG. 7 still further shows an illustrative user experience in conducting messaging communication.

FIG. 7 depicts a further illustrative embodiment. As described above, a text box 520 may be presented to the user. Further tactile input with the text box 520 may be a signal to the OS to present the user with a virtual keyboard 702 for text entry. According to a further implementation of the presently disclosed principles, the proposed responses 602 can be considered an alternate text entry method, such as an alternate to virtual keyboard 702. For example, virtual keyboard 702 includes a function key 704 that shifts the content of the virtual keyboard 702 keyboard keys from alphabet characters to numeric characters (not shown). In a similar manner, the user 105 may touch the indicia 524 to toggle between proposed responses 602 and virtual keyboard 702. Further, a selected response, e.g., 602a, can be populated in text box 520. By use of the virtual keyboard 702 in connection with text cursor 706, the user 105 can alter the proposed response 602a in the text box 520. Therefore, the proposed responses 602 can be further customized by the user 105, who still obtains the convenience of the proposed response 602 as compared to having typed the entire response via virtual keyboard 702.

The foregoing embodiments have been described with respect to a messaging app 340, however they are not limited thereto. For example, and without limitation, the presently disclosed principles can be equally applied to email or voicemail messages as to text messages. Moreover, the presently described principles may be implemented in a manner independent of any particular messaging platform that may be used to convey the messages from one device 110 to another.

Figure 8:
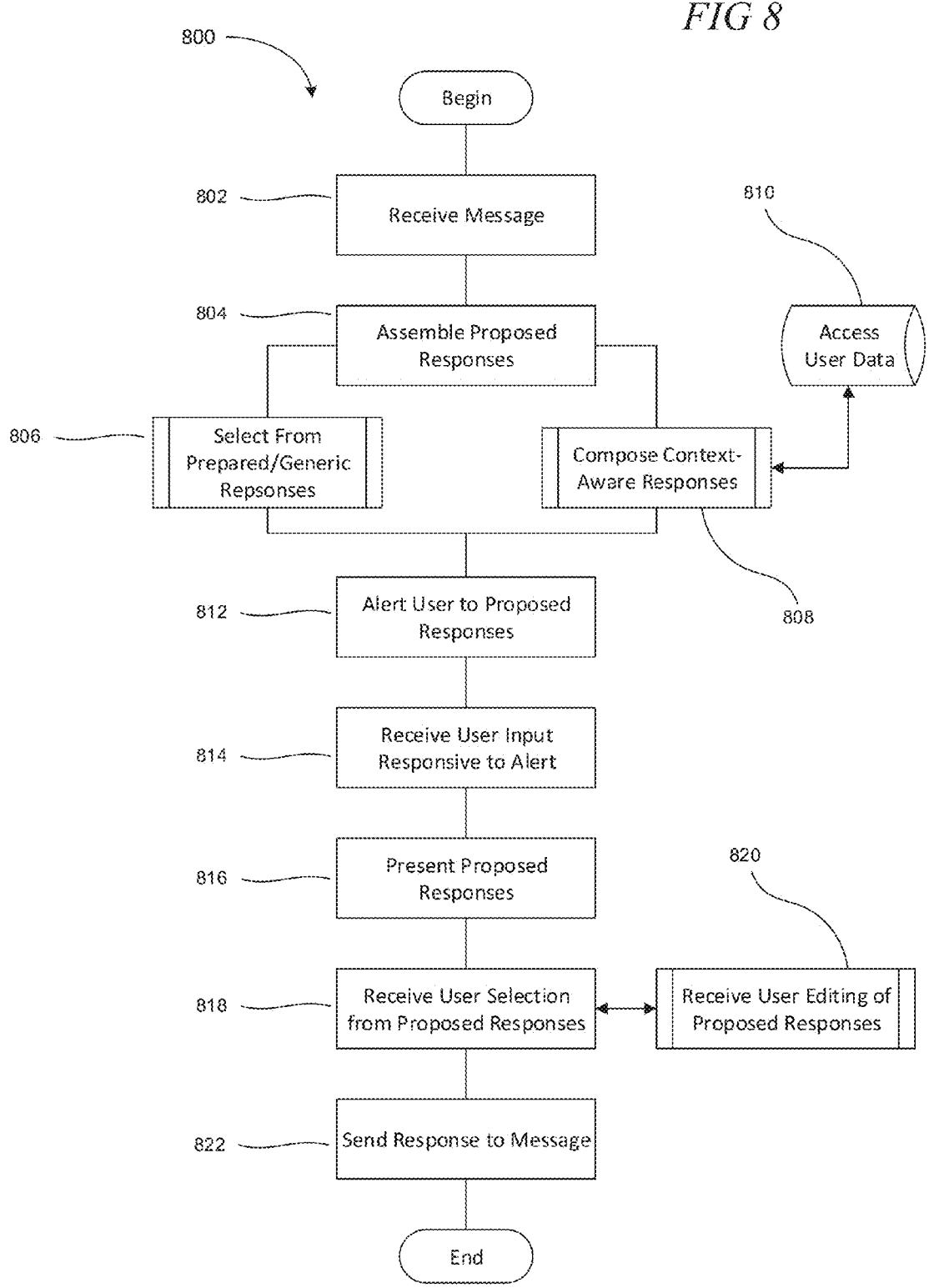
FIG. 8 is a flowchart of an illustrative method of a smart automatic composition of short messaging responses.

FIG. 8 is a flowchart of an illustrative method 800 of a smart automatic composition of short messaging responses according to the presently disclosed principles. Unless specifically stated, the methods or steps shown in the flowchart and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

The user 105 of a device 110 receives a message in step 802. The device 110, for example via application layer 305 or OS layer 310 assembles one or more proposed responses to the message in step 804. Assembling the proposed responses 804 can include selecting from a number of prepared and/or generic responses, step 806. Prepared and/or generic responses are generally applicable to some, many, most or all types of incoming messages, without regard to the message content 516. Assembling the proposed responses 804 can also include composing context-aware responses in step 808. The context-aware responses can access and reference user data, in step 810, such as contact data, calendar data, location data, prior communication data, as described earlier.

The user 105 is then alerted to the preparation of proposed responses 602 to the incoming message in step 812. The user then interacts with the device 110 in response to the alert in step 814. The device 110 then presents the proposed responses to the user 105 in step 816, and receives from the user 105 a selection from the proposed responses in step 818. The user 105 may optionally edit a selected one of the proposed responses in step 820. The edits may be input as text via keyboard, or may be input via voice in connection with a voice recognition application, for example as part of the other operating system components 355, or an application 330. Thereafter the device 110 sends the response to the message in step 822. Sending the response in step 822 may optionally be with or without further input from the user 105.

Figure 9:
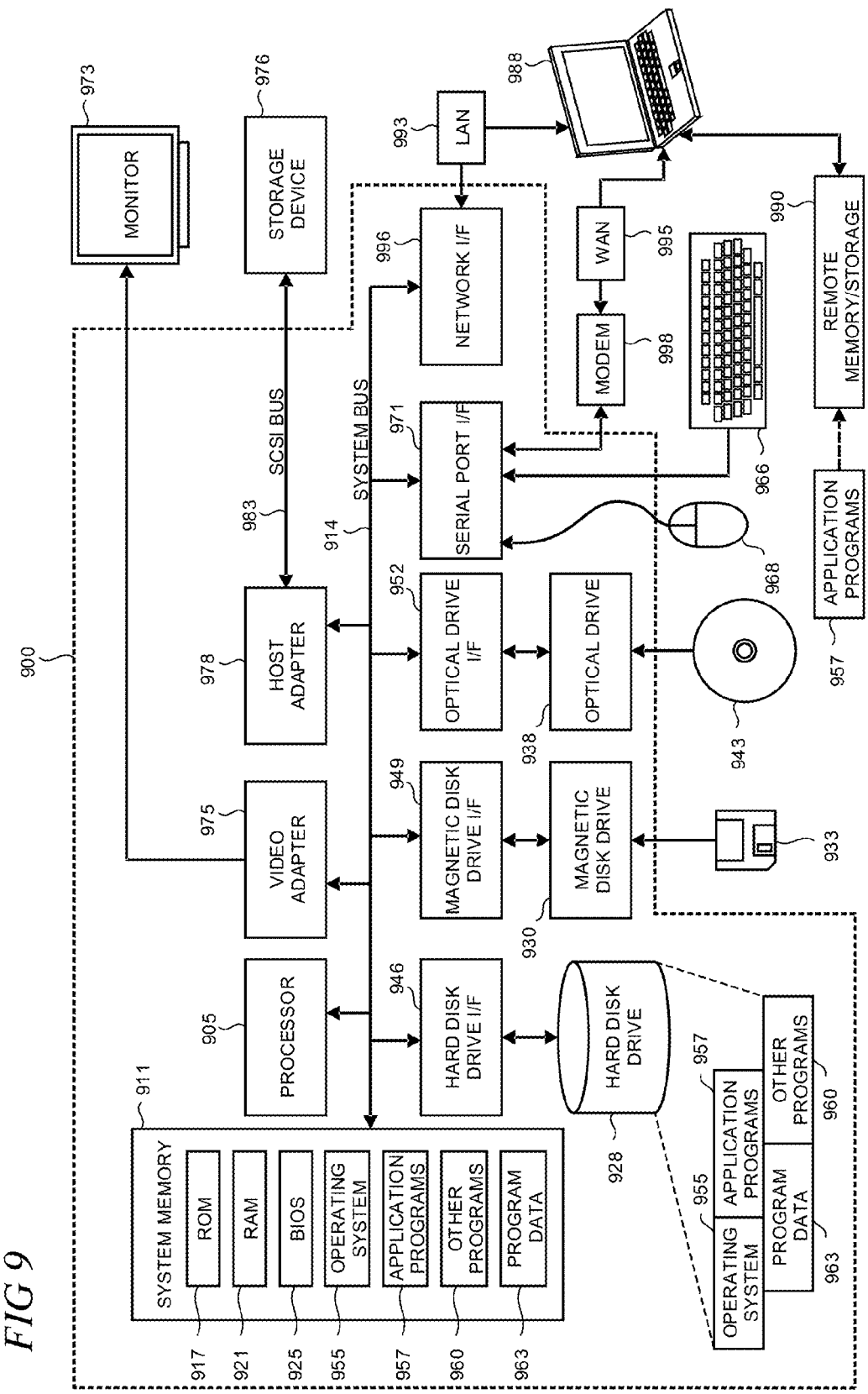
FIG. 9 is a simplified block diagram of an illustrative computer system with which the present smart automatic composition of short messaging responses may be implemented.

FIG. 9 is a simplified block diagram of an illustrative computer system 900 such as a PC, client machine, or server with which the present smart automatic composition of short messaging responses may be implemented. Computer system 900 includes a processor 905, a system memory 911, and a system bus 914 that couples various system components including the system memory 911 to the processor 905. The system bus 914 may be any of several types of bus structures including a memory bus or memory controller, a peripheral bus, or a local bus using any of a variety of bus architectures. The system memory 911 includes read only memory (ROM) 917 and random access memory (RAM) 921. A basic input/output system (BIOS) 925, containing the basic routines that help to transfer information between elements within the computer system 900, such as during startup, is stored in ROM 917. The computer system 900 may further include a hard disk drive 928 for reading from and writing to an internally disposed hard disk (not shown), a magnetic disk drive 930 for reading from or writing to a removable magnetic disk 933 (e.g., a floppy disk), and an optical disk drive 938 for reading from or writing to a removable optical disk 943 such as a CD (compact disc), DVD (digital versatile disc), or other optical media. The hard disk drive 928, magnetic disk drive 930, and optical disk drive 938 are connected to the system bus 914 by a hard disk drive interface 946, a magnetic disk drive interface 949, and an optical drive interface 952, respectively. The drives and their associated computer-readable storage media provide non-volatile storage of computer-readable instructions, data structures, program modules, and other data for the computer system 900. Although this illustrative example includes a hard disk, a removable magnetic disk 933, and a removable optical disk 943, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present smart automatic composition of short messaging responses. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, does not include waves, signals, and/or other transitory and/or intangible communication media.

A number of program modules may be stored on the hard disk, magnetic disk 933, optical disk 943, ROM 917, or RAM 921, including an operating system 955, one or more application programs 957, other program modules 960, and program data 963. A user may enter commands and information into the computer system 900 through input devices such as a keyboard 966 and pointing device 968 such as a mouse. Other input devices (not shown) may include a microphone, joystick, game pad, satellite dish, scanner, trackball, touchpad, touch screen, touch-sensitive device, voice-command module or device, user motion or user gesture capture device, or the like. These and other input devices are often connected to the processor 905 through a serial port interface 971 that is coupled to the system bus 914, but may be connected by other interfaces, such as a parallel port, game port, or universal serial bus (USB). A monitor 973 or other type of display device is also connected to the system bus 914 via an interface, such as a video adapter 975. In addition to the monitor 973, personal computers typically include other peripheral output devices (not shown), such as speakers and printers. The illustrative example shown in FIG. 9 also includes a host adapter 978, a Small Computer System Interface (SCSI) bus 983, and an external storage device 976 connected to the SCSI bus 983.

The computer system 900 is operable in a networked environment using logical connections to one or more remote computers, such as a remote computer 988. The remote computer 988 may be selected as another personal computer, a server, a router, a network PC, a peer device, or other common network node, and typically includes many or all of the elements described above relative to the computer system 900, although only a single representative remote memory/storage device 990 is shown in FIG. 9. The logical connections depicted in FIG. 9 include a local area network (LAN) 993 and a wide area network (WAN) 995. Such networking environments are often deployed, for example, in offices, enterprise-wide computer networks, intranets, and the Internet.

When used in a LAN networking environment, the computer system 900 is connected to the local area network 993 through a network interface or adapter 996. When used in a WAN networking environment, the computer system 900 typically includes a broadband modem 998, network gateway, or other means for establishing communications over the wide area network 995, such as the Internet. The broadband modem 998, which may be internal or external, is connected to the system bus 914 via a serial port interface 971. In a networked environment, program modules related to the computer system 900, or portions thereof, may be stored in the remote memory storage device 990. It is noted that the network connections shown in FIG. 9 are illustrative and other means of establishing a communications link between the computers may be used depending on the specific requirements of an application of the present smart automatic composition of short messaging responses.

Figure 10:
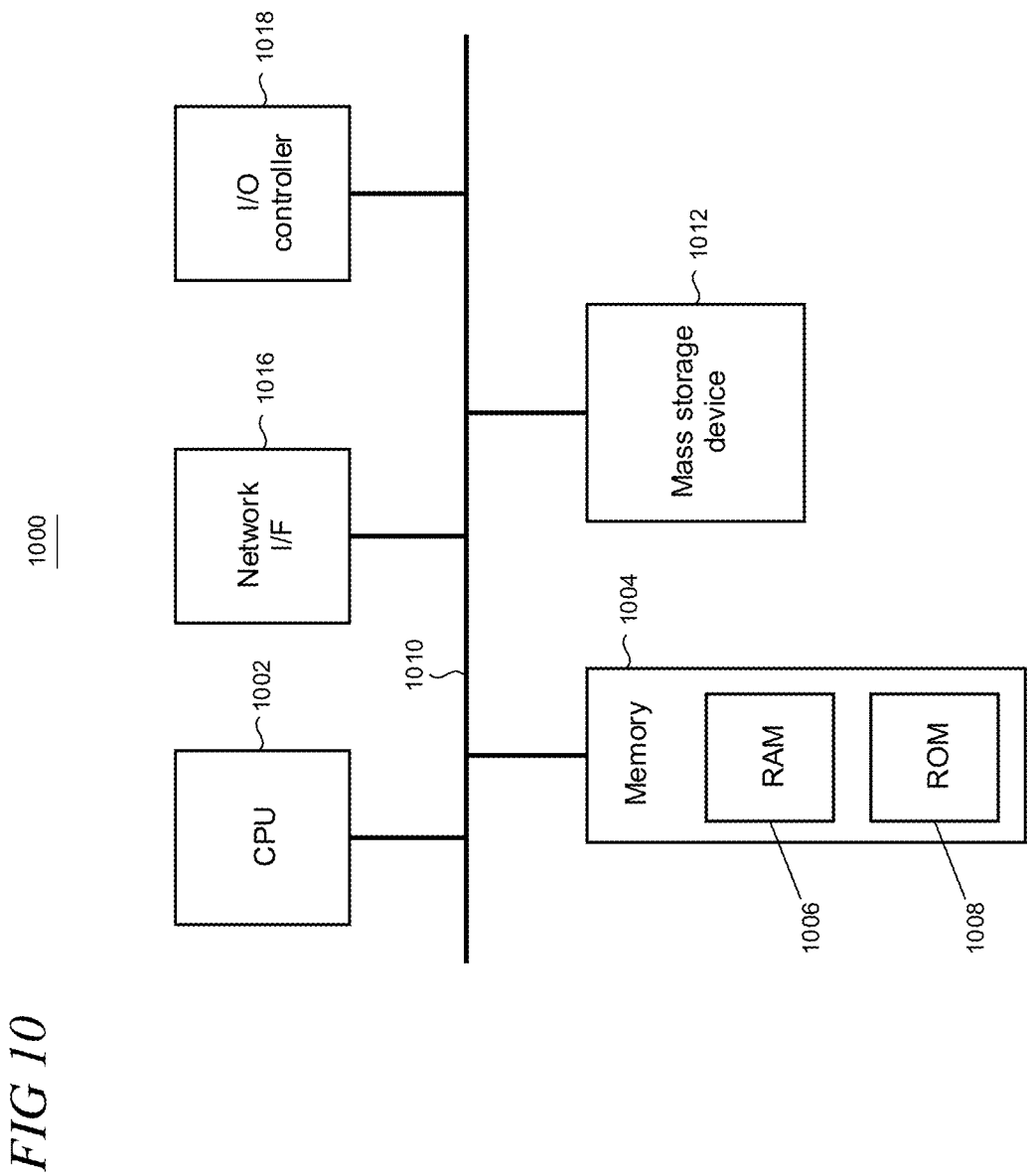
FIG. 10 shows an illustrative architecture for a device capable of executing the various components for providing the present smart automatic composition of short messaging responses.

FIG. 10 shows an illustrative architecture 1000 for a device capable of executing the various components described herein for providing the present smart automatic composition of short messaging responses. Thus, the architecture 1000 illustrated in FIG. 10 shows an architecture that may be adapted for a server computer, mobile phone, a PDA, a smartphone, a desktop computer, a netbook computer, a tablet computer, GPS device, gaming console, and/or a laptop computer. The architecture 1000 may be utilized to execute any aspect of the components presented herein.

The architecture 1000 illustrated in FIG. 10 includes a CPU (Central Processing Unit) 1002, a system memory 1004, including a RAM 1006 and a ROM 1008, and a system bus 1010 that couples the memory 1004 to the CPU 1002. A basic input/output system containing the basic routines that help to transfer information between elements within the architecture 1000, such as during startup, is stored in the ROM 1008. The architecture 1000 further includes a mass storage device 1012 for storing software code or other computer-executed code that is utilized to implement applications, the file system, and the operating system.

The mass storage device 1012 is connected to the CPU 1002 through a mass storage controller (not shown) connected to the bus 1010. The mass storage device 1012 and its associated computer-readable storage media provide non-volatile storage for the architecture 1000.

Although the description of computer-readable storage media contained herein refers to a mass storage device, such as a hard disk or CD-ROM drive, it may be appreciated by those skilled in the art that computer-readable storage media can be any available storage media that can be accessed by the architecture 1000.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 1000.

According to various embodiments, the architecture 1000 may operate in a networked environment using logical connections to remote computers through a network. The architecture 1000 may connect to the network through a network interface unit 1016 connected to the bus 1010. It may be appreciated that the network interface unit 1016 also may be utilized to connect to other types of networks and remote computer systems. The architecture 1000 also may include an input/output controller 1018 for receiving and processing input from a number of other devices, including a keyboard, mouse, or electronic stylus (not shown in FIG. 10). Similarly, the input/output controller 1018 may provide output to a display screen, a printer, or other type of output device (also not shown in FIG. 10).

It may be appreciated that the software components described herein may, when loaded into the CPU 1002 and executed, transform the CPU 1002 and the overall architecture 1000 from a general-purpose computing system into a special-purpose computing system customized to facilitate the functionality presented herein. The CPU 1002 may be constructed from any number of transistors or other discrete circuit elements, which may individually or collectively assume any number of states. More specifically, the CPU 1002 may operate as a finite-state machine, in response to executable instructions contained within the software modules disclosed herein. These computer-executable instructions may transform the CPU 1002 by specifying how the CPU 1002 transitions between states, thereby transforming the transistors or other discrete hardware elements constituting the CPU 1002.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 1000 in order to store and execute the software components presented herein. It may also be appreciated that the architecture 1000 may include other types of computing devices, including handheld computers, embedded computer systems, smartphones, PDAs, and other types of computing devices known to those skilled in the art. It is also contemplated that the architecture 1000 may not include all of the components shown in FIG. 10, may include other components that are not explicitly shown in FIG. 10, or may utilize an architecture completely different from that shown in FIG. 10.

Figure 11:
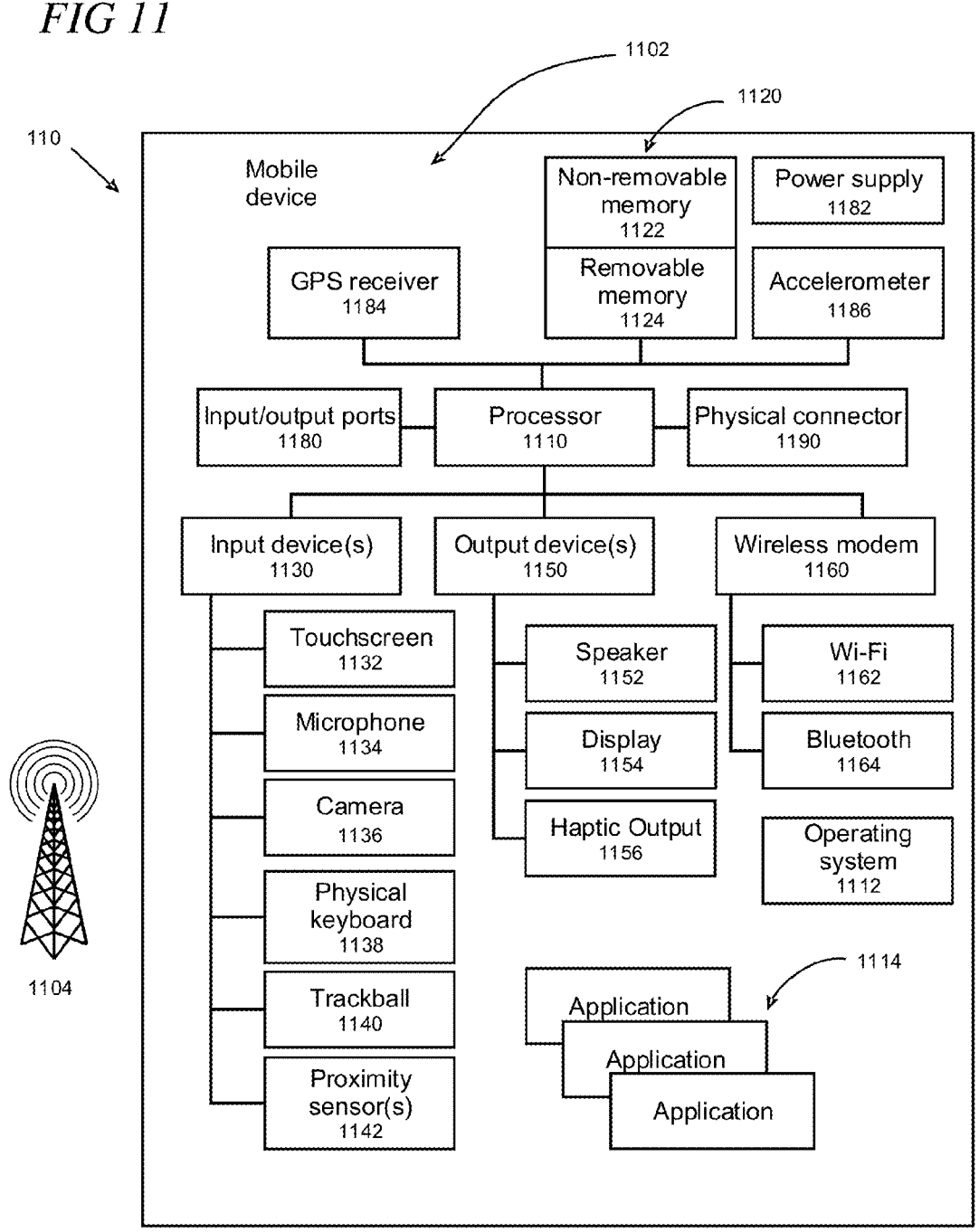
FIG. 11 is a functional block diagram of an illustrative mobile device for conducting electronic communication.

FIG. 11 is a functional block diagram of an illustrative mobile device 110 such as a mobile phone or smartphone including a variety of optional hardware and software components, shown generally at 1102. Any component 1102 in the mobile device can communicate with any other component, although, for ease of illustration, not all connections are shown. The mobile device can be any of a variety of computing devices (e.g., cell phone, smartphone, handheld computer, PDA, etc.) and can allow wireless two-way communications with one or more mobile communication networks 1104, such as a cellular or satellite network.

The illustrated device 110 can include a controller or processor 1110 (e.g., signal processor, microprocessor, microcontroller, ASIC (Application Specific Integrated Circuit), or other control and processing logic circuitry) for performing such tasks as signal coding, data processing, input/output processing, power control, and/or other functions. An operating system 1112 can control the allocation and usage of the components 1102, including power states, above-lock states, and below-lock states, and provides support for one or more application programs 1114. The application programs can include common mobile computing applications (e.g., image-capture applications, email applications, calendars, contact managers, web browsers, messaging applications), or any other computing application.

The illustrated mobile device 110 can include memory 1120. Memory 1120 can include non-removable memory 1122 and/or removable memory 1124. The non-removable memory 1122 can include RAM, ROM, Flash memory, a hard disk, or other well-known memory storage technologies. The removable memory 1124 can include Flash memory or a Subscriber Identity Module (SIM) card, which is well known in GSM (Global System for Mobile communications) systems, or other well-known memory storage technologies, such as "smart cards." The memory 1120 can be used for storing data and/or code for running the operating system 1112 and the application programs 1114. Example data can include web pages, text, images, sound files, video data, or other data sets to be sent to and/or received from one or more network servers or other devices via one or more wired or wireless networks.

The memory 1120 may also be arranged as, or include, one or more computer-readable storage media implemented in any method or technology for storage of information such as computer-readable instructions, data structures, program modules or other data. For example, computer-readable media includes, but is not limited to, RAM, ROM, EPROM, EEPROM, Flash memory or other solid state memory technology, CD-ROM (compact-disc ROM), DVD, (Digital Versatile Disc) HD-DVD (High Definition DVD), Blu-ray, or other optical storage, magnetic cassettes, magnetic tape, magnetic disk storage or other magnetic storage devices, or any other medium which can be used to store the desired information and which can be accessed by the mobile device 110.

The memory 1120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. The mobile device 110 can support one or more input devices 1130; such as a touchscreen 1132; microphone 1134 for implementation of voice input for voice recognition, voice commands and the like; camera 1136; physical keyboard 1138; trackball 1140; and/or proximity sensor 1142; and one or more output devices 1150, such as a speaker 1152, one or more displays 1154, or a haptic output device 1156 (e.g., without limitation, a rotary motor having an eccentrically weighted shaft) for haptic output. Other input devices (not shown) using gesture recognition may also be utilized in some cases. Other possible output devices (not shown) can include piezoelectric. Some devices can serve more than one input/output function. For example, touchscreen 1132 and display 1154 can be combined into a single input/output device.

A wireless modem 1160 can be coupled to an antenna (not shown) and can support two-way communications between the processor 1110 and external devices, as is well understood in the art. The modem 1160 is shown generically and can include a cellular modem for communicating with the mobile communication network 1104 and/or other radio-based modems (e.g., Bluetooth 1164 or Wi-Fi 1162). The wireless modem 1160 is typically configured for communication with one or more cellular networks, such as a GSM network for data and voice communications within a single cellular network, between cellular networks, or between the mobile device and a public switched telephone network (PSTN).

The mobile device can further include at least one input/output port 1180, a power supply 1182, a satellite navigation system receiver 1184, such as a GPS receiver, an accelerometer 1186, a gyroscope (not shown), and/or a physical connector 1190, which can be a USB port, IEEE 1394 (FireWire) port, and/or an RS-232 port. The illustrated components 1102 are not required or all-inclusive, as any components can be deleted and other components can be added.

Figure 12:
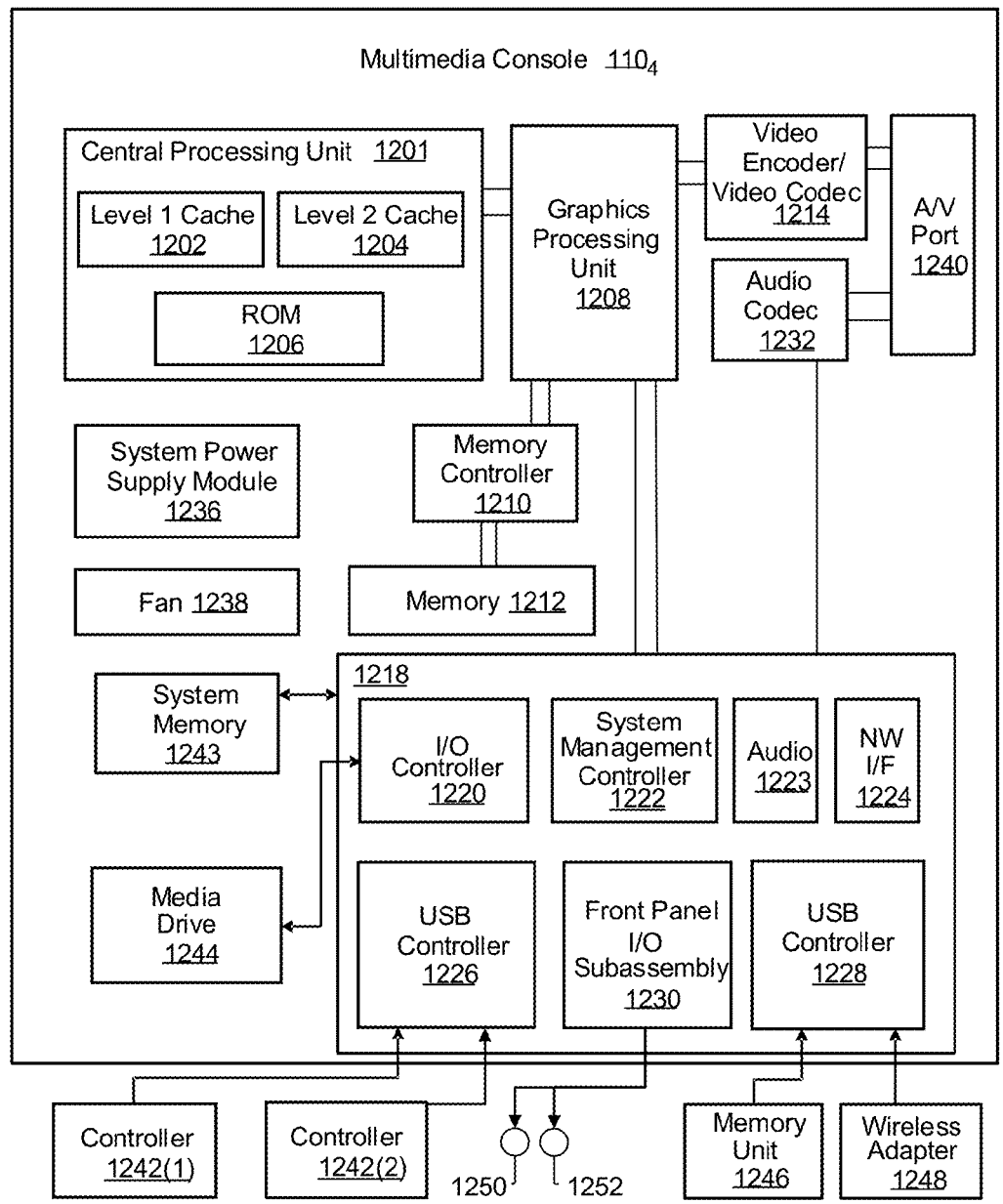
FIG. 12 is an illustrative functional block diagram of a multimedia console.

FIG. 12 is an illustrative functional block diagram of a multimedia console $110_4$. The multimedia console $110_4$ has a central processing unit (CPU) 1201 having a level 1 cache 1202, a level 2 cache 1204, and a Flash ROM (Read Only Memory) 1206. The level 1 cache 1202 and the level 2 cache 1204 temporarily store data and hence reduce the number of memory access cycles, thereby improving processing speed and throughput. The CPU 1201 may be configured with more than one core, and thus, additional level 1 and level 2 caches 1202 and 1204. The Flash ROM 1206 may store executable code that is loaded during an initial phase of a boot process when the multimedia console 110₄ is powered ON.

A graphics processing unit (GPU) 1208 and a video encoder/video codec (coder/decoder) 1214 form a video processing pipeline for high speed and high resolution graphics processing. Data is carried from the GPU 1208 to the video encoder/video codec 1214 via a bus. The video processing pipeline outputs data to an A/V (audio/video) port 1240 for transmission to a television or other display. A memory controller 1210 is connected to the GPU 1208 to facilitate processor access to various types of memory 1212, such as, but not limited to, a RAM.

The multimedia console 1104 includes an I/O controller 1220, a system management controller 1222, an audio processing unit 1223, a network interface controller 1224, a first USB (Universal Serial Bus) host controller 1226, a second USB controller 1228, and a front panel I/O subassembly 1230 that are preferably implemented on a module 1218. The USB controllers 1226 and 1228 serve as hosts for peripheral controllers 1242(1) and 1242(2), a wireless adapter 1248, and an external memory device 1246 (e.g., Flash memory, external CD/DVD ROM drive, removable media, etc.). The network interface controller 1224 and/or wireless adapter 1248 provide access to a network (e.g., the Internet, home network, etc.) and may be any of a wide variety of various wired or wireless adapter components including an Ethernet card, a modem, a Bluetooth module, a cable modem, or the like.

System memory 1243 is provided to store application data that is loaded during the boot process. A media drive 1244 is provided and may comprise a DVD/CD drive, hard drive, or other removable media drive, etc. The media drive 1244 may be internal or external to the multimedia console 110₄. Application data may be accessed via the media drive 1244 for execution, playback, etc. by the multimedia console 110₄. The media drive 1244 is connected to the I/O controller 1220 via a bus, such as a Serial ATA bus or other high speed connection (e.g., IEEE 1394).

The system management controller 1222 provides a variety of service functions related to assuring availability of the multimedia console 110₄. The audio processing unit 1223 and an audio codec 1232 form a corresponding audio processing pipeline with high fidelity and stereo processing. Audio data is carried between the audio processing unit 1223 and the audio codec 1232 via a communication link. The audio processing pipeline outputs data to the A/V port 1240 for reproduction by an external audio player or device having audio capabilities.

The front panel I/O subassembly 1230 supports the functionality of the power button 1250 and the eject button 1252, as well as any LEDs (light emitting diodes) or other indicators exposed on the outer surface of the multimedia console 1104. A system power supply module 1236 provides power to the components of the multimedia console 110₄. A fan 1238 cools the circuitry within the multimedia console 110₄.

The CPU 1201, GPU 1208, memory controller 1210, and various other components within the multimedia console 110₄ are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 1104 is powered ON, application data may be loaded from the system memory 1243 into memory 1212 and/or caches 1202 and 1204 and executed on the CPU 1201. The application may present a graphical user interface that provides a consistent user experience when navigating to different media types available on the multimedia console 110₄. In operation, applications and/or other media contained within the media drive 1244 may be launched or played from the media drive 1244 to provide additional functionalities to the multimedia console 110₄.

The multimedia console 110₄ may be operated as a standalone system by simply connecting the system to a television or other display. In this standalone mode, the multimedia console 110₄ allows one or more users to interact with the system, watch movies, or listen to music. However, with the integration of broadband connectivity made available through the network interface controller 1224 or the wireless adapter 1248, the multimedia console 110₄ may further be operated as a participant in a larger network community.

When the multimedia console 110₄ is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbps), etc. Because these resources are reserved at system boot time, the reserved resources do not exist from the application's view.

In particular, the memory reservation preferably is large enough to contain the launch kernel, concurrent system applications, and drivers. The CPU reservation is preferably constant such that if the reserved CPU usage is not used by the system applications, an idle thread will consume any unused cycles.

With regard to the GPU reservation, lightweight messages generated by the system applications (e.g., pop-ups) are displayed by using a GPU interrupt to schedule code to render pop-ups into an overlay. The amount of memory needed for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV re-sync is eliminated.

After the multimedia console 110₄ boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 1201 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 1242(1) and 1242(2)) are shared by gaming applications and system applications. The input devices are not reserved resources, but are to be switched between system applications and the gaming application such that each will have a focus of the device. The application manager preferably controls the switching of input stream, without knowledge of the gaming application's knowledge and a driver maintains state information regarding focus switches.

Various exemplary embodiments of the present smart automatic composition of short messaging responses are now presented by way of illustration and not as an exhaustive list of all embodiments. An example includes a method for facilitating personal communication using an electronic communication device including a digital assistant, the method comprising: receiving an electronic communication message; using a digital assistant, preparing one or more proposed responses to the received electronic communication message; alerting a user to the availability of the one or more proposed responses to the received electronic communication message, the alert including at least one of a visual or aural representation of the digital assistant; presenting the one or more proposed responses to the received message to the user responsive to a user input related to the alert; receiving a user selection of a response from among the one or more proposed responses; and sending a response to the electronic communication including at least some portion of the user-selected response.

In another example, the method further comprises preparing one or more proposed responses to the received electronic communication message including selecting a proposed response from a predetermined set of proposed responses. In another example, the method further comprises selecting a proposed response from a predetermined set of proposed responses that are generically responsive to a variety of messages. In another example, the method further comprises preparing one or more proposed responses to the received electronic communication message including contextually analyzing the contents of the received electronic communication, and selecting a proposed response that is responsive to the contents of the received electronic communication. In another example, the method further comprises selecting a proposed response that is responsive to the contents of the received electronic communication with reference to user-stored data made available to the electronic device. In another example, the method further comprises selecting a proposed response that is responsive to the contents of the received electronic communication with reference to user-stored data made available to the electronic device, user-stored data including one or more of contact data, calendar data, message contents data, and location data. In another example, the method further comprises calculating a confidence metric reflecting the confidence that each of the one or more proposed responses is responsive to the electronic communication message. In another example, the method further comprises presenting the one or more proposed responses to the received message in rank order of their respective confidence metric. In another example, the method further comprises displaying an indicia to a user representing the availability of the one or more proposed responses to the received electronic communication message including varying the intensity of the indicia display in a manner related to the confidence metric of one or more of the proposed responses. In another example, the method further comprises presenting alternately the one or more proposed responses to the received message to the user and a display for receiving text input from the user, responsive to a repeated user input related to the displayed indicia. In another example, the method further comprises receiving edits to the user-selected response before sending the response. In another example, the method further comprises sending a response to the electronic communication including at least some portion of the user-selected response without further user input. In another example, the method further comprises alerting a user to the availability of the one or more proposed responses to the received electronic communication message, including at least one of a visual alert, an aural alert, and a haptic alert.

A further example includes an electronic communication device configured to facilitate personal communication, the device comprising: one or more processors; an input device; an output device; and a computer readable storage medium, storing thereon a program of instructions which, when executed by the one or more processors, cause the electronic communication device to: implement a digital assistant functionality; receive an electronic communication message; prepare one or more proposed responses to the received electronic communication message; alert a user to the availability of the one or more proposed responses to the received electronic communication message, substance of the alert including at least one of a visual or aural representation of the digital assistant; present the one or more proposed responses to the received message to the user responsive to a user input related to the alert; receive a user selection of a response from among the one or more proposed responses; and send a response to the electronic communication including at least some portion of the user-selected response.

In another example, the device further comprises an output device including at least one of an aural output device, a visual output device, and a haptic output device; and the program of instructions, when executed by the one or more processors, further cause the electronic communication device to alert a user to the availability of the one or more proposed responses to the received electronic communication message with at least one of a visual alert, an aural alert, and a haptic alert. In another example, the device further comprises an output device including a display; and an input device including a touchscreen integral with the display. In another example, the device further comprises the program of instructions, when executed by the one or more processors, further cause the electronic communication device to: selectively display a virtual keyboard on the touchscreen; and selectively receive text input from the user to edit a proposed response before sending.

A further example includes a method for facilitating personal communication using an electronic communication device, the method comprising: using an output device of the electronic communication device, presenting the contents of an incoming electronic communication message; using an output device of the electronic communication device, alerting a user to the availability of one or more proposed responses to the incoming electronic message; using an input device of the electronic communication device, receiving a user response to the alert; using an output device of the electronic communication device, presenting the contents of the one or more proposed responses; and using an input device of the electronic communication device, receiving a user selection from among the proposed responses.

In another example, the method further comprises using an input device of the electronic communication device, receiving user modifications to the user-selected proposed response. In another example, the method further comprises using a processor of the electronic communication device, determining a relevance metric of each one of the one or more proposed responses; and using an output device of the electronic communication device, altering the presentation of each one of the one or more proposed responses related to a confidence metric of the proposed response.

Based on the foregoing, it may be appreciated that technologies for implementing a smart automatic composition of short messaging responses have been disclosed herein. Although the subject matter presented herein has been described in language specific to computer structural features, methodological and transformative acts, specific computing machinery, and computer-readable storage media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and may not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for facilitating personal communication for a user of an electronic device, comprising:
   receiving an electronic communication message at the electronic device;
   preparing one or more proposed responses to the received electronic communication message, in which each of the proposed responses is associated with a level of confidence or relevance;
   generating an alert to the user of an availability of the one or more proposed responses, wherein the alert uses animation that varies according to the level of confidence or relevance; and
   suppressing the alert when the level of confidence or relevance is below a predetermined threshold.

2. The method of claim 1, further comprising:
   preparing one or more proposed responses to the received electronic communication message including selecting a proposed response from a predetermined set of proposed responses.

3. The method of claim 2, further comprising:
   selecting a proposed response from a predetermined set of proposed responses that are generically responsive to a variety of messages.

4. The method of claim 1, further comprising:
   preparing one or more proposed responses to the received electronic communication message including contextually analyzing contents of the received electronic communication message, and selecting a proposed response that is responsive to the contents of the received electronic communication message.

5. The method of claim 4, further comprising:
   selecting a proposed response that is responsive to the contents of the received electronic communication message with reference to user-stored data made available to the electronic device.

6. The method of claim 5, further comprising:
   selecting a proposed response that is responsive to the contents of the received electronic communication message with reference to user-stored data made available to the electronic device, user-stored data including one or more of contact data, calendar data, message contents data, and location data.

7. The method of claim 1, further comprising:
   calculating a confidence metric reflecting the confidence that each of the one or more proposed responses is responsive to the electronic communication message.

8. The method of claim 7, further comprising:
   presenting the one or more proposed responses to the received electronic communication message in rank order of their respective confidence metric.

9. The method of claim 7, further comprising:
   displaying an indicium to a user representing availability of the one or more proposed responses to the received electronic communication message including varying an intensity of the indicium display in a manner related to the confidence metric of one or more of the proposed responses.

10. The method of claim 9, further comprising:
    presenting alternately the one or more proposed responses to the received electronic communication message to the user and a display for receiving text input from the user, responsive to a repeated user input related to the displayed indicium.

11. The method of claim 1, further comprising:
    receiving a user selection of a response from among the one or more proposed responses; and
    receiving edits to the user-selected response before sending the response.

12. The method of claim 1, further comprising:
    sending a response to the electronic communication message including at least some portion of the user-selected response without further user input.

13. The method of claim 1, further comprising:
    generating the alert to the user of the availability of the one or more proposed responses to the received electronic communication message, including at least one of a visual alert, an aural alert, and a haptic alert.

14. An electronic communication device configured to facilitate personal communication, the device comprising:
    one or more processors;
    an input device;
    an output device; and
    a computer readable storage medium, storing thereon a program of instructions which, when executed by the one or more processors, cause the electronic communication device to:
      receive an electronic communication message;
      prepare one or more proposed responses to the received electronic communication message;
      determine a level of confidence for each of the one or more proposed responses;
      alert a user to an availability of the one or more proposed responses to the received electronic communication message, substance of the alert including at least one of a visual or aural representation of a digital assistant, in which the visual representation includes animation that varies according to the confidence level, and wherein the visual or aural representation of the alert is suppressed when the determined confidence level is below a predetermined threshold;
      send a response from the one or more proposed responses to the electronic communication message.

15. The device of claim 14, further comprising:
    the output device including at least one of an aural output device, a visual output device, and a haptic output device; and
    the program of instructions, when executed by the one or more processors, further cause the electronic communication device to alert the user to the availability of the one or more proposed responses to the received electronic communication message with at least one of a visual alert, an aural alert, and a haptic alert.

16. The device of claim 14, further comprising:
the output device including a display; and
the input device including a touchscreen integral with the display.

17. The device of claim 16, further comprising:
the program of instructions, when executed by the one or more processors, further cause the electronic communication device to:
selectively display a virtual keyboard on the touchscreen; and
selectively receive text input from the user to edit a proposed response before sending.

18. A method for facilitating personal communication using an electronic communication device, the method comprising:
receiving an electronic communication message at the electronic device;
preparing one or more proposed responses to the received electronic communication message, in which each of the proposed responses is associated with a level of confidence or relevance;
alerting a user to an availability of the one or more proposed responses to the received electronic communication message, the alert including at least one of a visual or aural representation of a digital assistant in which the visual representation includes one or more graphic objects, the presentation of the graphic objects being varied according to the level of confidence or relevance; and
suppressing the alert when the level of confidence or relevance is below a predetermined threshold.

19. The method of claim 18, further comprising:
using an input device of the electronic communication device, receiving user modifications to a user-selected proposed response.

20. The method of claim 18, further comprising:
using a processor of the electronic communication device, determining a relevance metric of each one of the one or more proposed responses; and
using an output device of the electronic communication device, altering presentation of each one of the one or more proposed responses related to a confidence metric of the proposed response.

\* \* \* \* \*